United States Patent [19]

Walker

[11] 4,201,485

[45] May 6, 1980

[54] APPARATUS FOR PROPORTIONING AND MIXING POWDERED HARDENERS WITH LIQUID RESINS

[75] Inventor: Ronald E. Walker, Auburn, Wash.

[73] Assignee: Weyerhaeuser Company, Tacoma, Wash.

[21] Appl. No.: 879,667

[22] Filed: Feb. 21, 1978

[51] Int. Cl.$^2$ .............................................. B01F 7/02
[52] U.S. Cl. ................................... 366/156; 366/177; 366/324; 425/208
[58] Field of Search .................. 366/156, 177, 79, 81, 366/88, 90, 99, 100, 321, 324; 425/204–209

[56] References Cited

U.S. PATENT DOCUMENTS

| | | | |
|---|---|---|---|
| 2,005,950 | 6/1935 | Moroney et al. ...................... | 366/156 |
| 2,680,879 | 6/1954 | Schnuck et al. ...................... | 366/88 X |
| 3,102,694 | 9/1963 | Frenkel et al. ...................... | 366/156 X |
| 3,221,369 | 12/1965 | Vesilind ................................. | 366/88 |
| 3,538,300 | 10/1970 | Ainsworth et al. . | |
| 3,652,064 | 3/1972 | Lehnen et al. ...................... | 366/321 X |
| 3,730,487 | 5/1973 | Lund .................................... | 366/100 X |
| 3,920,229 | 11/1975 | Piggott ................................. | 366/156 X |
| 3,941,535 | 3/1976 | Street .................................... | 425/208 |
| 4,061,620 | 12/1977 | Gillern ................................. | 260/29.3 |

OTHER PUBLICATIONS

Oborg & Jones, Machinery's Handbook, 1968, pp. 1309–1311.

*Primary Examiner*—John M. Jillions

[57] ABSTRACT

An apparatus for continuously mixing liquid resin and powdered hardeners in accurate proportions to produce adhesives is described. A mixing screw and tube lock into a mounting from which they may easily be removed for quick cleanout. The preferred screw has mixing threads that are of the buttress type, having rectangular leading and sloped trailing edges in cross section. The screw is divided into transporting and high shear rate mixing sections. In the transporting section, the rectangular thread edges face in the direction of material flow through the tube. The high shear rate section's buttress threads are modified by spiral cuts in the threads, at a greater lead than the buttress threads. This section is installed with the sloped edge facing the direction of material flow.

6 Claims, 8 Drawing Figures

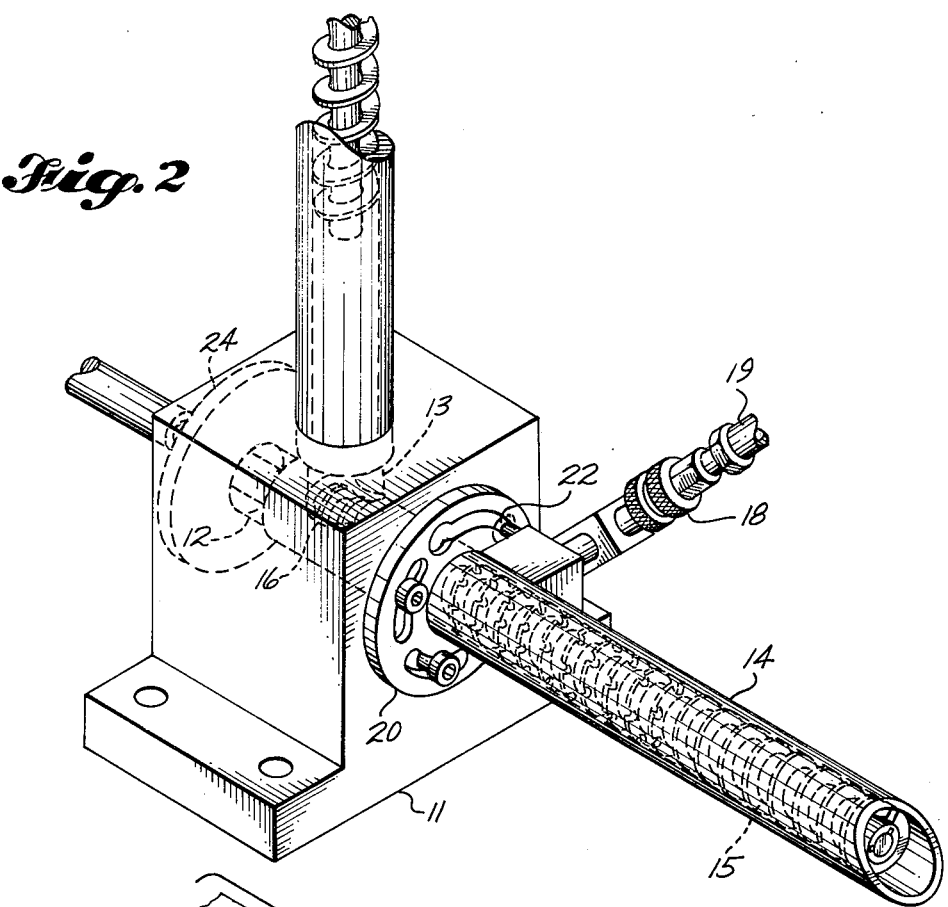
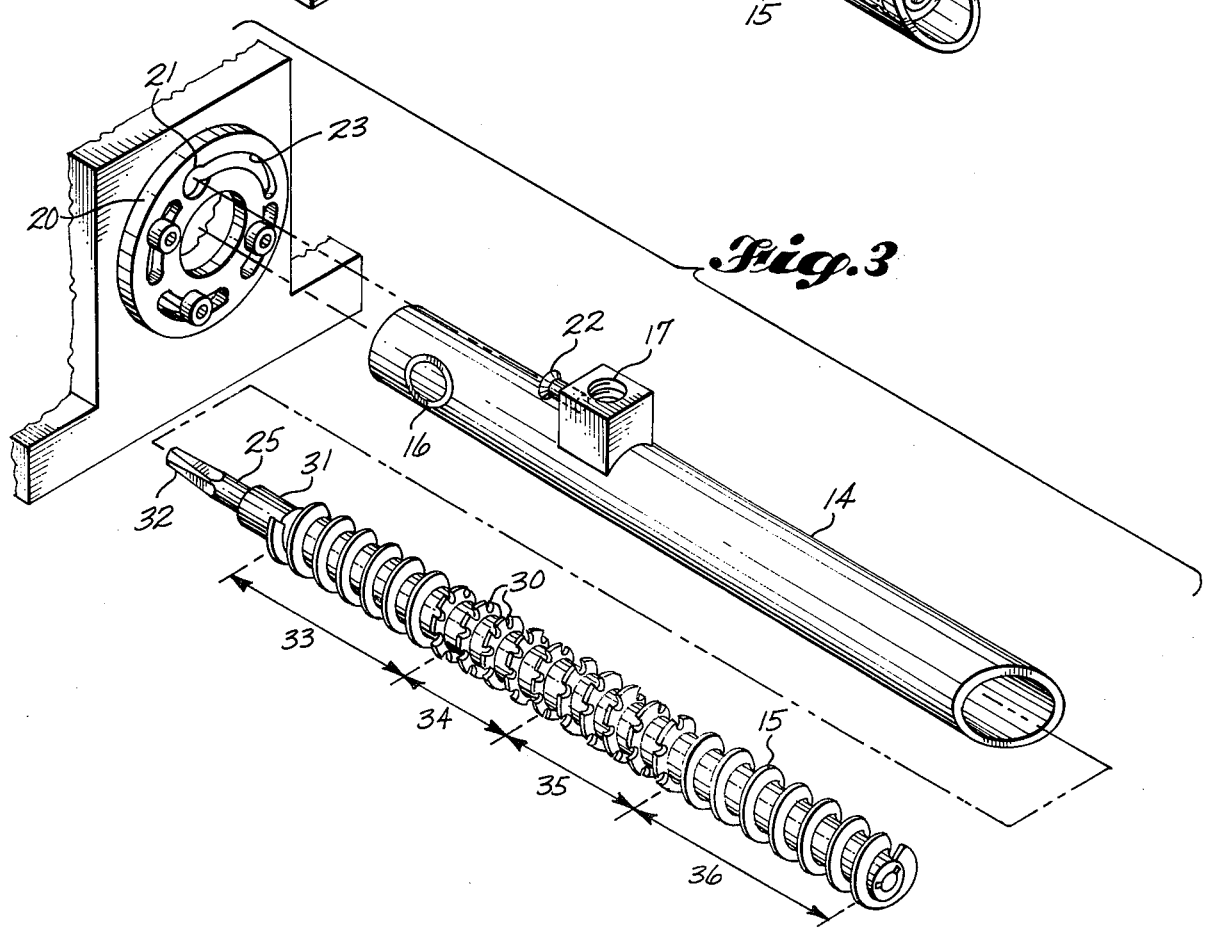

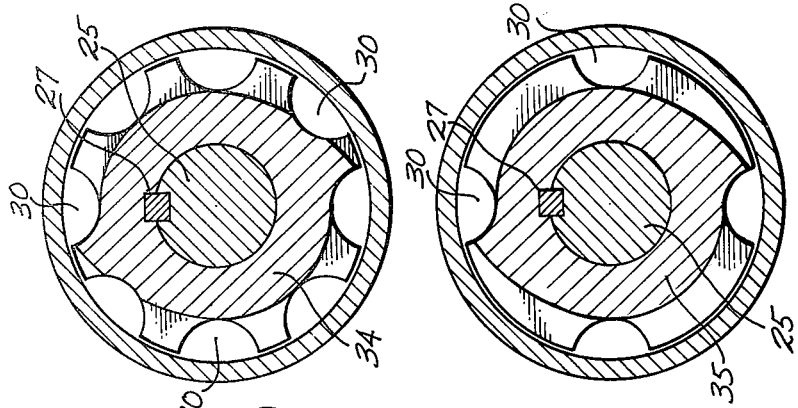
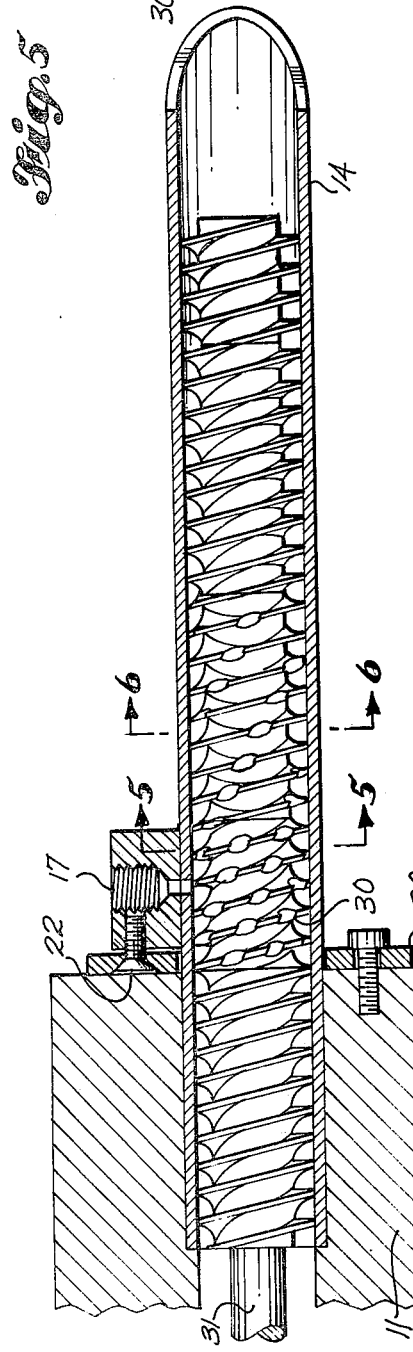
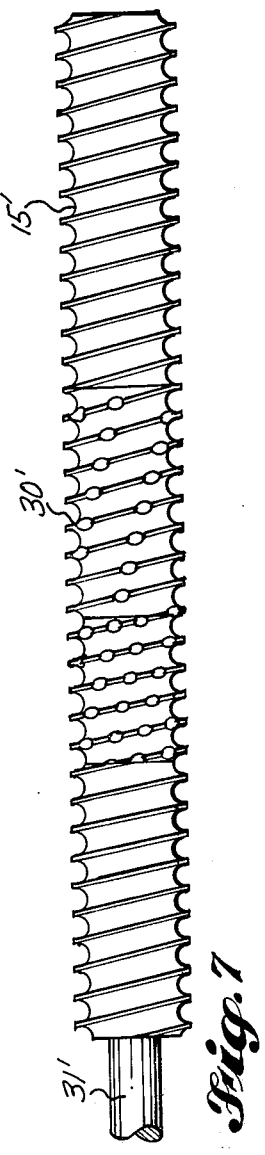
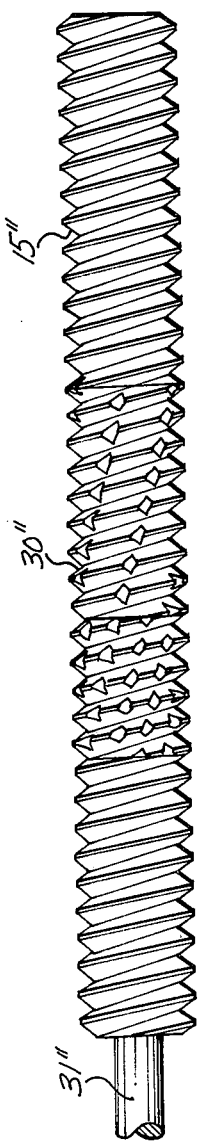

APPARATUS FOR PROPORTIONING AND MIXING POWDERED HARDENERS WITH LIQUID RESINS

BACKGROUND OF THE INVENTION

The field of the invention is apparatus for proportioning and mixing liquid with powders. The materials feed into a screw conveyor-type mixing assembly designed to ensure uniformly mixed final product. Materials are metered with the delivery systems connected by a gear system so that the proper ratio of materials is maintained. The mixing apparatus of interest may be useful in food processing, making adhesives for the wood products industry and other general mixing applications requiring blending of a powder into a liquid where proportions are critical to product quality.

Multi-component adhesives are commonly used in the wood products industry in laminating, finger jointing and edge gluing. These applications will become increasingly important in the wood products industry as available trees become smaller and larger finished pieces need to be made by gluing together the small logs.

In the typical finger-jointing system, adhesive is pumped to an applicator system, incorporating a finger-type extruder head. A pneumatic control system releases glue intermittently as the work piece is advanced through the gluing machine. Finger-jointing requires small amounts of glue with many flow interruptions, as determined by a particular mill application. Glue mixing and dispensing systems for these processes are generally small in size but require constant cleaning to prevent fouling and plugging.

A typical wood jointing resin adhesive may be of the phenol-formaldehyde-resorcinol type, for example, as described by Gillern in U.S. Pat. No. 4,061,620, assigned to Weyerhaeuser Company. The resin is typically a liquid comprised of monomers and other oligomers of the basic chemical structure. These resins, when admixed with a methylene donor or hardener/curing agent, react to form an insoluble thermoset resin, useful as an exterior adhesive.

Hardeners are usually powdered paraformaldehyde or acetaldehyde, which may be blended with wood flour, clays or other fillers to help ensure rapid and uniform dispersion of the hardener in the resin.

Proper proportioning and mixing are absolutely essential in making dependable and reliable adhesives. An inadequate amount of hardener will result in poorly cured adhesives which will form weak bonds. The desired proportions of resin to hardener are those that supply a small excess of curing agent over that necessary to get total conversion to a completely infusable product, insoluble in common solvents.

Mill operations today often batch mix adhesives, particularly where only small amounts are required. This method is time consuming and sometimes results in variable and poor adhesive qualities.

Continuous machines currently available for exactly proportioning and blending powders with resins are expensive and generally not economical for the relatively small capacities needed. Many machines on the market use a weigh-belt feeder to meter powder which tends to make for a bulky, awkward machine.

Screw conveyor mixers are well known in the industry. For example, Ainsworth et al in U.S. Pat. No. 3,591,145 describes continuously mixing large amounts of dry clay with linseed oil to make putty. An extrusion stage is required to mix the "plastic" materials. The Ainsworth apparatus is designed to handle large amounts of material. There are no provisions for quick cleanout since there is little danger of the putty polymerizing in the conveyor. The Ainsworth extrusion mixer at its low turning speeds would not adequately mix the resin adhesives of interest because it would not provide the high shear rate mixing conditions necessary.

An object of the invention described below is accurate metering of powder and liquid to assure a selected ratio of ingredients. The apparatus then thoroughly mixes the components to make a finished, intimately blended product.

The mixing system is capable of mechanically dosing resin glues with a powder hardener continuously, at low capacities. The resulting adhesives are equal or better to batch-mixed materials in quality. Any combination of liquid and powder components may be mixed. For example, a glue powder plus water and liquid hardening agent could be mixed. Likewise, a liquid glue plus a powder extender and a liquid hardening agent, or a liquid glue plus a powdered hardening agent.

The simplicity of the apparatus results in capital cost savings over those described in the art. A key advantage of the system is that cleanup is facilitated. There is less waste water generated from cleanup. The mixing assembly may be removed, without tools, for washing in an appropriate solvent.

BRIEF SUMMARY OF THE INVENTION

An apparatus is described for accurately proportioning and mixing liquid resins with powdered hardeners to produce uniform adhesives continuously.

The adhesive blending apparatus comprises, in summary: (a) a mixing tube and screw assembly; (b) a mounting block for securely supporting the assembly; (c) a motor for turning the mixing screw; (d) a means for delivering measured quantities of powder to the mixing tube; (e) a pump means for delivering a measured quantity of liquid resin to the mixing tube; and (f) a motor for both powder and liquid delivery means, including a gear combination means, interconnecting the delivery means, for accurately fixing the desired proportion of materials fed to the mixing assembly.

The mixing screw transports the powder into a high shear rate mixing zone at the liquid-powder interface. The screw mixing elements are buttress-type threads that, in cross section, have a rectangular leading and sloping trailing edges. The materials tranporting screw elements have the rectangular thread edge facing the direction of flow through the tube. In the high shear rate mixing section, the basic buttress threads are modified by spiral cuts into the thread, at a greater lead than the base thread. The sloping edge of the base thread faces the direction of the material flow.

Other basic thread designs, consistent with the materials to be mixed, may be utilized.

A distinct advantage of the apparatus is the ease with which it may be dismantled for cleaning. A locking lug on the mixing tube and a slot on the mounting block secure and snugly hold the tube in place against rotation and undesired movement. The assembly may be removed by simply rotating the mixing tube until the locking lug no longer engages the mounting block slot.

The mixing screw connection to its motor is designed for quick release.

BRIEF DESCRIPTION OF THE DRAWINGS

FIG. 2 details the mixing tube, screw assembly and mounting block.

FIG. 3 shows the mixing screw disassembled.

FIG. 4 depicts the mixing assembly in partial cross section.

FIG. 5 is a cross section in the direction of arrows 5—5 of FIG. 4 of the mixing assembly interface mixing section.

FIG. 6 is a cross section in the direction of arrows 6—6 of FIG. 4 of the mixing assembly blending section.

FIGS. 7 and 8 are alternative base screw thread profiles.

Figure 1:
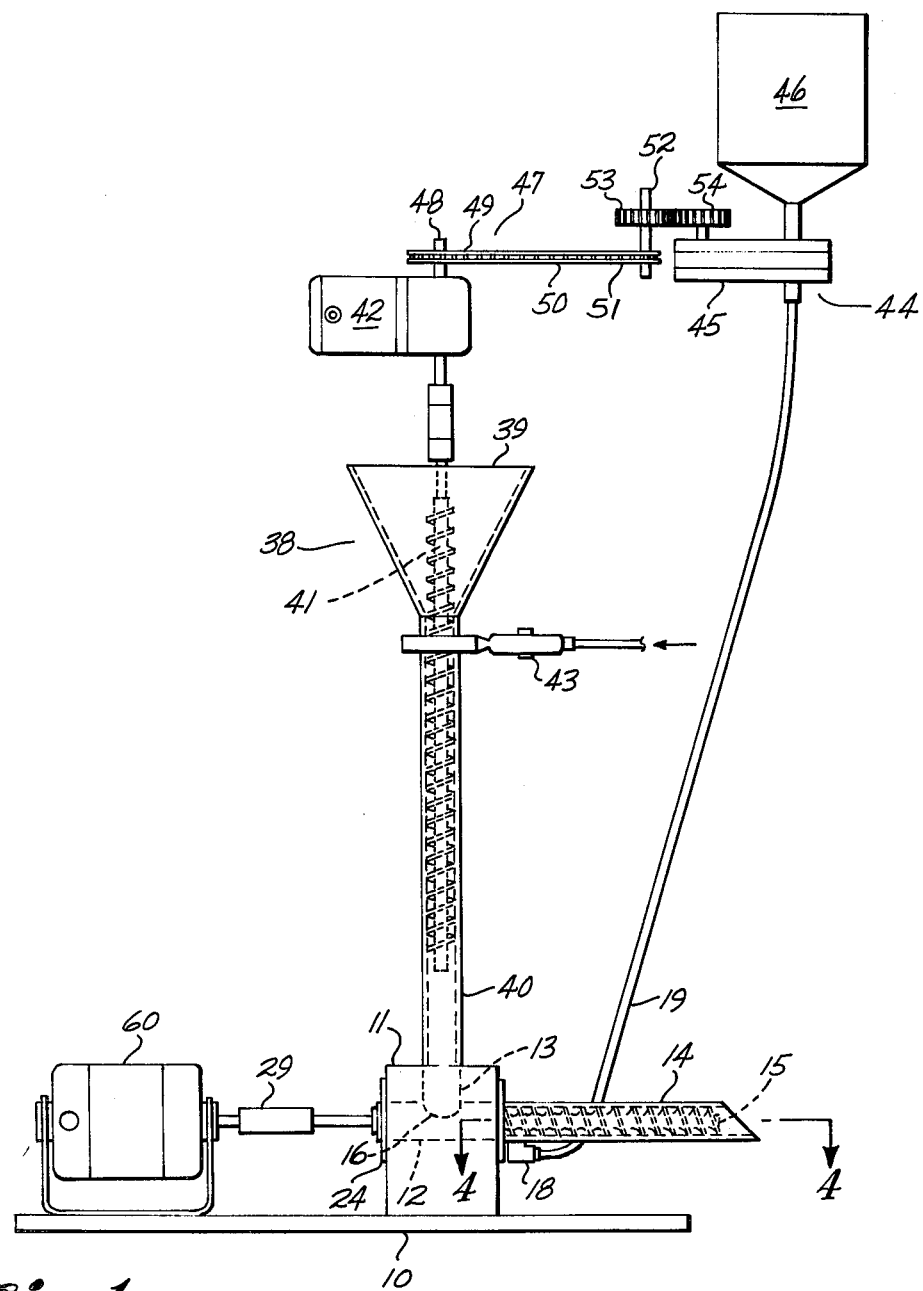
FIG. 1 illustrates the continuous mixing apparatus of this invention.

A preferred embodiment of the mixing apparatus is shown in FIG. 1. The mixing apparatus is supported upon base 10. A mounting block 11, shown in detail in FIG. 2, is fixed to base 10 and is provided with a substantially horizontal bore 12. A vertical bore 13 communicates and aligns with the horizontal bore 12. The bore 12 is of suffcient diameter to receive and support mixing tube 14. The mixing tube 14 comprises a hollow tube, open at both ends and of suffcient diameter to accommodate a mixing screw 15. Mixing tube 14 is provided with an aperture 16 for aligning with block boring 13. Mixing tube 14 is also provided with liquid inlet aperture 17. Fitting 18, secured to the mixing tube 14 at inlet 17 provide a threaded quick connect for a liquid line 19.

The mixing tube 14 and screw 15 are fixed to the mounting block 11 by a twist-lock type connection, best shown in FIGS. 2–3. Mixing tube securing collar 20 is bolted to the block 11. A locking lug 22, shown in the form of a flathead screw, is threaded into fitting 17 on the mixing tube 14. A slot is cut into collar 20 having portion 21 designed to accommodate the head portion of locking lug 22. The slot continues forming an arcuate portion 23. The opening in portion 23 is only large enough to accommodate the lug's shaft but is hollowed out behind the slot opening to accommodate the lug head.

Thus, the mixing tube 14 is inserted into mounting block 11 with the lug 22 on fitting 17 aligned with and inserted into opening 21 on the securing collar 20. The tube is rotated about its longitudinal axis so that lug 22 rotates into the arcuate portion 23 securely holding the tube 14 into block 11. Locking lug 22 tends to hold the tube tightly against collar 20, preventing the tube from rotating with the mixing screw 15 during operation. The mixing tube and screw are easily disengaged from the mounting block by counter-rotating the tube and pulling it free from the mounting block.

Aperture 16 and liquid fitting 17 are positioned so that when the locking system is fully engaged, the block boring 13 aligns with tube aperture 16.

The mixing tube 14, when locked in place by lug 22, is flush with the opposite edge of bore 12, against thrust bearing retaining plate 24, bolted to block 11. Appropriate gaskets and seals, not shown, prevent leakage.

The mixing tube 14 is fitted with a mixing screw 15 which extends from the powder inlet boring 13, past liquid inlet aperture 17 and near to the end of the mixing tube. To prevent the glue from "flinging" from the high-speed screw, the tube extends beyond its end. The screw 15 fits rather loosely in the mixing tube 14, having clearances of 0.005–0.030 inch. During operation, the screw tends to "float" on the adhesive flowing about it. The mixing screw 15 is turned at high speed by motor 60, typically at 1700 rpm.

Referring to FIGS. 3–6, the mixing screw 15 comprises a shaft 25 on which hollow screw elements 33–36 are fastened with key 27.

The shaft 25 is milled and tapered to a substantially rectangular cross section at end 32. The tapered end fits into the motor coupling 29 in a manner that permits ease of removal and reinstallation to accommodate pulling the screw from the apparatus for cleaning. The shaft is provided with bearing surfaces 31 and is supported by appropriate bearings, thrust washers and gaskets (not shown) which are retained in block 11 by retaining plate 24.

Hollow screw elements 33–36, fixed to shaft 25 by key 27, are designed to convey or transport the feed materials, mix at high shear rate, blend and, finally, transport the finished adhesive into a holding tank (not shown) or to the work piece applicator (not shown).

The preferred screw elements 33–36 are based on the well known buttress-type thread, each thread, in cross section, having a rectangular leading edge followed by a 60° sloped trailing edge. The pitch or spacing between threads is an important consideration as it is a factor in determining the resin capacity of the apparatus. There must be sufficient free volume about the screw to handle the desired output from the screw. Even so the screw will contain at any given time a small amount of materials which make cleaning easier and decrease waste loss. The preferred base screw is double-threaded, having a ¼-inch pitch and a ½-inch lead. "Lead" is defined as the distance a point on a thread travels horizontally per revolution of the screw. Internal corners of the thread are rounded to 3/64ths and 1/16-inch, respectively to discourage resin build up on the threads. See Oborg and Jones, Machinery's Handbook (18th ed. Horton, 1968) at 1309–1311 for a general description of buttress thread characteristics.

The elements 33 and 36 of the mixing screw 15 are designed primarily to move the materials through the tube. These transport elements preferably comprise portions of buttress thread with the square edge facing in the direction of travel of flow through the mixer. The square edges tend to move the material forward economically with a minimum of loss of efficiency through slippage.

The conveyor mixing screw 15 is provided with high shear rate mixing elements 34 and 35. The high shear mixing section assure that homogeneous mixing of the components is accomplished quickly near the liquid entrance 17.

The high shear mixing capability derives from spiral or helical cuts 30, cut into the basic screw threads, equally spaced about the thread circumference of elements 34, 35 as shown in FIGS. 5–6. The spiral cuts 30 are milled into the buttress threads and are generally semi-circular cross section. The cuts 30 are made with a greater lead than the base thread. The preferred embodiments shown in FIGS. 3–8 are cut at about a 30° angle relative to the axis of the shaft 15, at a lead of 4 inches per revolution, about eight times the lead of the basic buttress thread. Cuts 30 generally reach the roots of the threads in depth.

The degree of shear mixing is controlled by the number of cuts made about the circumference. The number of cuts 30 in the embodiments shown range from eight at "interface" mixing element 34 of FIG. 5. "Interface" indicates that zone where the liquid first comes into contact with the powder. In "blending" element 35, shown in cross section in FIG. 6, the number of spiral cuts 30 is decreased to four since less shear is required at this point.

The interface, high shear rate element 34 is installed on shaft 25 with the sloped edge of the preferred buttress thread facing the direction of the material flow. The sloped surface encourages material to slip, rolling backwards, improving mixing action. Transport characteristics of the screw are sufficent to move the material through the tube at an adequate, although reduced rate, compared to the transporting elements.

The blending element 35 is essentially of the same configuration as element 34 except that there are fewer spiral cuts 30 about the element. Mixing action is thus less violent but adequate to complete thorough mixing, thereby decreasing the power load required to turn the screw 15.

The last element 36 of screw 15 is a transport portion with the square leading edges of the threads pumping finished adhesives from the tube open end.

The powder metering system 38 comprises, in part, a hopper 39 feeding to a substantially vertical tube 40 which discharges powder through boring 13 in block 11 into the mixing tube 14 through port 16. The screw element 41, powered by gear motor 42, meters the flow of powder through the tube 40. Air vibrator 43 insures that the material does not bridge, plug or otherwise interrupt delivery of powder. The powder screw element 41, is of a modified buttress type, somewhat similar to the portions of mixing screw designed to transport materials.

Liquid delivery system 44 feeds resin to the screw mixing tube. The system 44 comprises a positive displacement gear pump 45 fed from a drum or tank 46 of liquid. The pump is driven by the same gear motor 42 that drives the powder delivery system 38. Tube 19 connects the discharge of liquid pump 45 to the liquid inlet 17 of the mixing tube 14.

A system of gears 47 interconnects the motor 42 with the powder and liquid metering system 38, 44 to ensure the desired ratio components is fed to the mixing tube. FIG. 1 shows the gear train between the motor 42 and the liquid pump 45. The gear motor turns a shaft 48 which, through sprocket 49, 51 and roller chain 50, turns the shaft 52 upon which the gear 53 is mounted. This gear meshes with the gear 54 which turns the pump 45. The combination of sprockets and gears selected determines the output rate of the gear pump 45. The ratio of powder to liquid delivered by the materials delivering systems is selected by choosing appropriate gear and sprocket combinations.

In operation, powder is fed to receiving hopper 39, by a means not shown. Motor 42 turns metering screw 41 delivering a measured quantity of powder into the mixing tube 14. Simultaneously, the liquid tank 46 feeds liquid resin to metering pump 45 which is powered through proportioning gears 47 by motor 42. The measured, proportioned liquid from the pump discharges through line 19 into the mixing tube 14.

The mixing tube screw 15 transports powder into contact with the incoming resin. The interface mixing zone 34 works the materials together under high shearing conditions. Blending zone 35 continues working the components together until a homogeneous adhesive results. The finished adhesive is then discharged through transport zone 36 from the apparatus.

Metering accuracy may be easily tested by weighing the output from the powder screw 41 and liquid pump 45. This procedure is utilized for calibration of the proportioning system. Adhesive output can be adjusted by selecting the appropriate combination of gears and motor speeds. Proportioning accuracy of the machine is $\pm 2\%$, typically $\pm 1.5\%$. At full output, variance of output is about $\pm 1\%$.

The mixing screw is the key element in assuring the success of this invention. The type of thread selected depends upon the type of materials to be mixed and the throughput required. Alternative embodiments to the preferred buttress base thread of the screw are shown in FIGS. 7 and 8, which have the advantage that they may be made of a single piece of stock rather than in the hollow elements of the preferred screw.

The thread 15' of FIG. 7 is suitable where viscosities or other characteritics of materials will likely result in accumulation on the screw threads. This design has a lower throughput capability than the buttress thread design. The high shear flutings 30' are essentially the same as previously described.

The thread design 15" shown in FIG. 8 is comprised of about 60° triangular threaded faces. In self-cleaning capabilities and throughput, it is intermediate between the buttress and rounded thread designs of FIG. 7.

Operating Example

A unit according to the above description was fabricated, designed to produce 100–475 grams per minute of the phenolformaldehyde-resorcinol adhesive described in U.S. Pat. No. 4,061,620. The liquid resin was prepared according to Examples 3–4 at Col. 9–11. The resulting liquid resin had an initial viscosity of RS on the Gardner bubble tube viscosity scale at 25° C., a solids content of 53.4% and a Tecam gel time of 79 minutes. The powdered hardener consisted of, by weight, 40% walnut shell flour, 10% clay and 50% paraformaldehyde powder.

The gear combinations were selected to insure a 5:1 ratio of resin to powder entering the mixing tube.

The mixing tube is 1-inch ID with a 1-inch powder inlet and a $\frac{1}{4}$-inch liquid port, having an overall length of 11 inches. The mixing screw is of the buttress type having a pitch of $\frac{1}{4}$ inch and a lead of $\frac{1}{2}$ inch. The interface mixing and blending sections have eight and four equally spaced, with respect to the circumference, flutes formed by spiral cuts made with a 3/16-inch round-end mill to a depth of 1/10-inch, with a lead of 4 inches per revolution. The mixing screw is comprised of elements keyed to the shaft consisting of: $2\frac{1}{2}$ inches of transporting section, $1\frac{1}{2}$ inches of interface mixing section, a 2-inch blending section and a $2\frac{1}{4}$-inch transporting section, as indicated in the description above.

The output rate is governed by the speed of proportioning system and was adjustable from a few grams per minute up to 370 grams per minute. The ultimate, upper limit of the output was determined by the mixing screw speed.

The resulting adhesives were compared in the laboratory with standard hand-mixed samples.

The data indicated that ratio deviations for the machine-made material was less than $\pm 2\%$ and output repeatability was $\pm 1\%$.

Gel time was also used to compare quality of machine-mixed with hand-mixed adhesives. Results, at 30° C. were 64.7 and 65.2 minutes repectively.

The ability of the machine-mixed adhesive to bond wood was compared with that of hand-mixed standards. In laboratory gluing tests, identical sets of Douglas fir billets were made up using machine-mixed and hand-weighed hand-mixed adhesives. These billets were then tested for dry shear and delamination. The results of these tests are given below:

|  | Dry Shear Strength (PSI) | Wood Failure % | % Delamination ASTM | AITC |
|---|---|---|---|---|
| Machine Mixed | 1032 | 97 | 2.4 | 1.4 |
| Standard Hand Mix | 1061 | 95 | 1.7 | 2.0 |

A finger jointing gluing mill trial produced comparable results.

Modifications of the above-described apparatus to accommodate feed material characteristics and desired end-product qualities will be apparent to those skilled in the art. For example, the mixing screw elements may be arranged in various sequences, depending upon where in the mixer high shearing rate is desired.

The ultimate motor speed selected to turn the mixing screw depends upon the screw design and materials characteristics. The speed must be high enough so that sufficient shear rate is generated in the interface and blending zones to result in a uniformly mixed product. With the screw elements of FIG. 7 and FIG. 8, minimum speeds of about 1,000 and 1,700 rpm, respectively, are required. The minimum speed for the preferred thread design is roughly about 1,000 rpm.

What is claimed is:

1. In an apparatus for continuously mixing liquid and powder materials to a uniform composition, of the type wherein a mixing tube receives said materials through separate, axially spaced inlets and a mixing screw, extending longitudinally in said tube, upon rotation, transports said materials through the tube and causes them to be intimately mixed together, the improved mixing screw, comprising:
   threads, having in cross section, a rectangular leading edge and a sloping trailing edge, said screw divided into
   materials transporting elements, installed in the mixing tube with the leading edge of the thread facing the direction of material flow through said tube, and
   shear mixing elements, said threads modified by spiral cuts into the threads with a greater lead than the lead of said threads and installed with the thread sloping edge facing in the direction of material flow.

2. The apparatus of claim 1 wherein the shear mixing element is divided into an interface mixing region where the powder and liquid initially come into contact and a blending region where mixing continues but with less shear, said blending region distinguished by a fewer number of spiral cuts about the circumference of the threaded portion.

3. The apparatus of claim 2, wherein the mixing screw threaded elements comprise: consecutively arranged elements for transporting, interface mixing, blending and transporting.

4. The apparatus of claim 1 wherein the shear mixing element spiral cuts are semi-circular in cross section, cut to the root of the thread and at a 30° angle with respect to the longitudinal axis of the screw.

5. The apparatus of claim 2 wherein the spiral cuts consist of eight equally spaced flutes about the screw circumference of the screw in the interface mixing elements and four cuts about the blending elements.

6. In an apparatus for continuously mixing liquid and powder material, of the type wherein a mixing tube, open at both ends, receives said materials through separate, axially spaced, inlets; a mixing screw, extending longitudinally in said tube, having threaded surface means for transporting and mixing, and a spindle means for power input and bearing surfaces, upon rotation, transports said materials through the tube and causes them to be intimately mixed; a mounting block, having a first aperture therethrough for supporting the mixing tube substantially horizontally, a second, substantially vertical aperture with which a material inlet of said tube is aligned, and means for securing the tube in said block, said block including sealing and bearing means, fitted in the first aperature, for sealing the end of the mixing tube and supporting the mixing screw bearing surfaces; and a motor means for turning said mixing screw, an improved means for securing said tube to said mounting block, comprising:
   a locking lug fixed to the mixing tube, said lug consisting of a shaft and a larger diameter head; and
   a slot, in the mounting block consisting of a cavity milled to receive said lug head and an arcuate slot having an opening substantially equal to the shaft diameter and an interior cavity capable of accommodating said lug head, wherein upon insertion of the tube into said mounting horizontal aperture the locking lug is fully inserted in the receiving cavity and rotation of the tube to align the vertical aperture of the block with a materials inlet of the tube causes the lug to move in an arcuate path, held in the locking slot sufficiently securely so that the tube remains in place during operation of the apparatus.

* * * * *